F. U. STOKES.
CORN-PLANTER AND FERTILIZER-DISTRIBUTER.

No. 194,313. Patented Aug. 21, 1877.

WITNESSES:
Chas. Nida
J. H. Scarborough

INVENTOR:
F. U. Stokes
BY
ATTORNEYS.

UNITED STATES PATENT OFFICE.

FREDERICK U. STOKES, OF URBANA, OHIO.

IMPROVEMENT IN CORN-PLANTER AND FERTILIZER-DISTRIBUTER.

Specification forming part of Letters Patent No. 194,313, dated August 21, 1877; application filed October 14, 1876.

*To all whom it may concern:*

Figure 1:
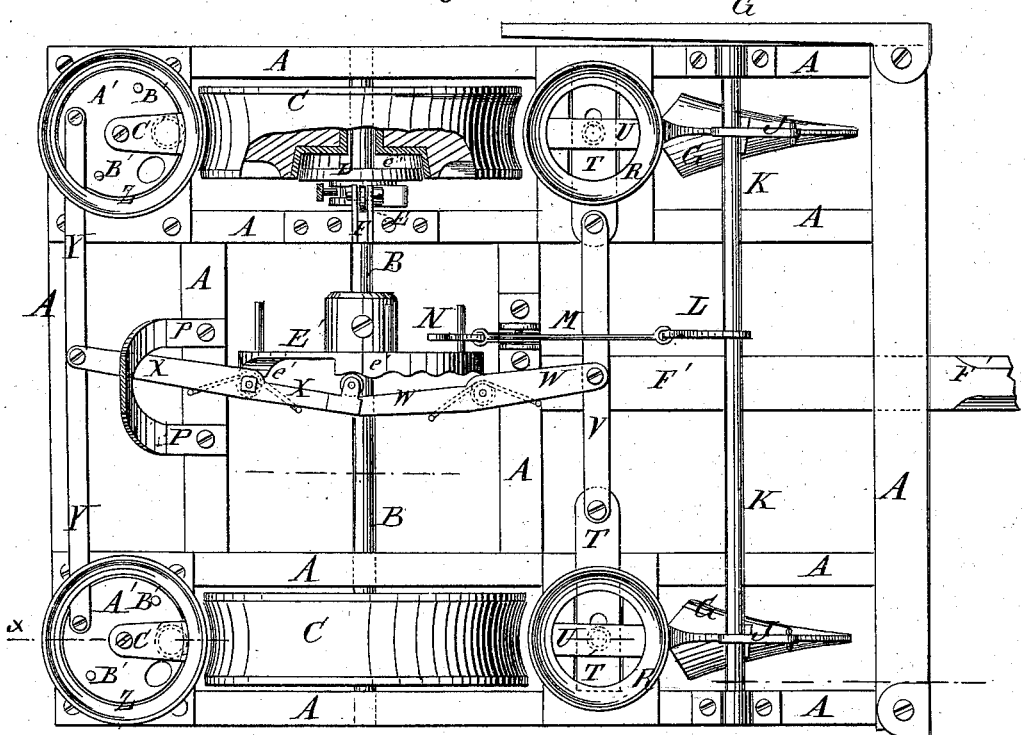
Figure 2:
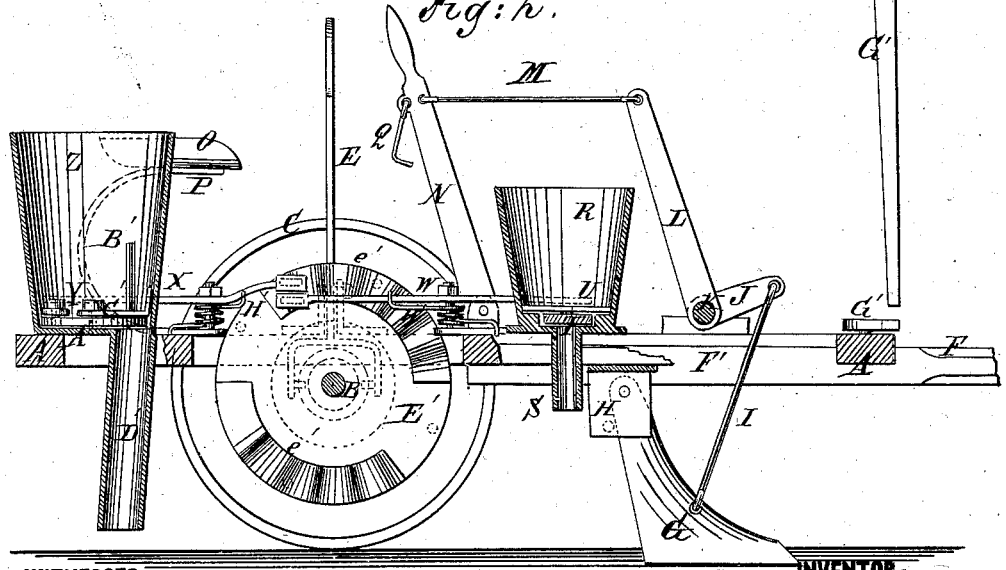

Be it known that I, FREDERICK U. STOKES, of Urbana, in the county of Champaign and State of Ohio, have invented a new and useful Improvement in Combined Corn-Planter and Fertilizer-Distributer, of which the following is a specification:

Figure 1 is a top view of my improved machine, part being broken away to show the construction. Fig. 2 is a vertical longitudinal section of the same, taken through the line *x x*, Fig. 1.

The object of this invention is to furnish an improved machine which shall be so constructed as to open furrows to receive the seed, drop the seed, and cover it, and then drop a fertilizer upon the hills, to mark the hills, and at the same time promote the growth of the plants, and which shall be simple in construction and automatic in action.

The invention will first be described in connection with the drawing, and then pointed out in the claim.

A is the frame, in bearings attached to the side bars of which revolves the axle B. Upon the end parts of the axle B are placed two drive-wheels, C, the faces of which are made wide, and are concaved to adapt them to press the soil into the furrows and cover the seed. In the inner end of the hub of one or both of the wheels C is formed a circular tapering recess, *c'*, to receive the tapering wheel D, which slides upon the axle B, and is so connected with it that the said wheel and axle must revolve together. The hub of the clutch-wheel D is grooved to receive the forked end of the lever E, which is pivoted to a support, F, attached to the frame A, so that by operating the said lever E the wheel C and axle B may be thrown into and out of gear with each other.

G are the plows for opening a furrow to receive the seed, the upper ends of the shanks of which are pivoted to supports H, attached to the frame A in such a way that the said plows may be swung forward to raise them from the ground.

To the colters of the plow G are pivoted the lower ends of the rods or chains I, the upper ends of which are pivoted to the ends of the arms J. The other ends of the arms J are rigidly attached to the shaft K, which works in bearings attached to the frame A, and to it is attached a lever, L. To the upper end of the lever L is pivoted the end of a rod or chain, M, the other end of which is pivoted to the lever N. The lower end of the lever N is pivoted to the frame A in such a position that its upper end may be reached and operated by the driver from his seat O, the standard P of which is attached to the rear part of the frame A to raise the plows from the ground.

To the upper part of the lever N is attached a hook, Q, which may be hooked into a hole in the corner of the seat O, to hold the plows suspended from the ground when required.

R are the seed-hoppers, which are attached to the frame A, and have discharge-holes formed in their bottom, through which the seed passes into the spouts S, and is deposited in the bottom of the furrow in the rear of the plows G.

T are the dropping-slides, which work upon the bottoms of the hoppers R, through holes in the sides of said hopper. The slides T are provided with holes to receive the seed from the hoppers and convey it to the discharge-holes in the bottoms of said hoppers.

The slides T are prevented from carrying out any more seeds than enough to fill their holes by the cut-offs U attached to said hoppers R directly over their discharge-holes, and beneath which the said slides T pass. The slides T are connected by a bar, V, attached to their inner ends. To the middle part of the connecting-bar V is pivoted the forward end of the lever W, which is pivoted to the frame A, and the rear end of which overlaps the forward end of a similar lever, X.

The lever X is pivoted to the frame A, and its rear end is pivoted to a connecting-bar, Y.

The ends of the connecting-bar Y pass in through holes in the sides of the fertilizer-hoppers Z, and are pivoted to the disks A', which are fitted into the hoppers Z, and are pivoted at their centers to the centers of the bottoms of said hoppers.

To the disks A' are attached upwardly-projecting pins B', which keep the fertilizer stirred up, so that it may readily pass into the dropping-holes of the said disks. As the dropping-holes of the disks A' pass in beneath the cut-offs C', the fertilizer drops through the discharge-holes in the bottom of the hoppers Z into the spouts D', through which it passes to the ground. The operating mechanism of the machine is so arranged that the fertilizer dropped from the rear hoppers Z may fall exactly upon the hills planted from the forward hoppers R, so that, by using plaster or other light-colored fertilizer, the hills will be plainly marked, rendering any other marking of the land unnecessary, while enabling the field to be planted in accurate check-row. Upon the side edges of the overlapped ends of the levers W X are pivoted small friction-rollers, which roll along the side of the cam-wheel E' attached to the axle B. Upon one side of the wheel E' are formed two cams, e', and as the friction rollers or lugs of the levers W X pass up the inclines of said cams, the said levers W X operate the dropping-slides T and disks A', to bring their dropping-holes into position to receive the contents of the hoppers, and as the said rollers drop from the shoulders of the said cams, the said dropping-holes come beneath the cut-offs, and the seed and the fertilizer are dropped. The faces of the cams e' are grooved or corrugated transversely, as shown in Figs. 1 and 2, the effect of which is to shake or agitate the slides T and the disks A', to insure their being filled. To the plain side of the cam-wheel E' are attached pins to enable the driver to turn the said wheel with his foot to adjust it, should the cross-rows be getting out of line, and when starting in at the side of the field.

F' is the tongue, which is attached to the front and middle cross-bars of the frame A. To the ends of the front cross-bar of the frame A are pivoted two arms, G', of such a length that, when turned out into line with the said front cross-bar, and the machine is in proper position for planting the next row at the proper distance from the last one, the outer end of the inner arm G' will be directly over the last row planted, so as to serve as a gage to guide the driver in crossing the field.

When not in use the arm G' may be turned back into line with the side bars of the frame A. The adjacent ends of the levers W X are held against the cam-wheel E' by the springs H', which are attached to the frame A, and bear against the said levers, as shown in Figs. 1 and 2.

Other devices may be used instead of the springs H' for holding the levers W X against the cam-wheel E'—as, for instance, another wheel may be used upon the other side of the said levers made with projections where the recesses and recesses where the projections are of the said wheel E'.

By arranging foot-pins on the cam-wheel, and a hand-lever to operate the clutch, the driver can move the cam-wheel so as to straighten the rows when they seem to be getting out of alignment.

What I claim is—

The combination of the cam-wheel E' e' with the axle B, and with the levers W X, that operate the dropping slides and disks, substantially as herein shown and described.

FREDERICK U. STOKES.

Witnesses:
L. D. CONVERSE,
N. RHODES.